United States Patent Office 2,836,593
Patented May 27, 1958

2,836,593
17α,21-OXIDO DERIVATIVES OF CORTISONE AND HYDROCORTISONE

Roger E. Beyler, Westfield, and Frances Hoffman, Newark, N. J., assignors to Merck & Co., Inc., Rahway, N. J., a corporation of New Jersey No Drawing. Application April 29, 1957
Serial No. 655,526

5 Claims. (Cl. 260—239.55)

This invention relates to adrenal cortical hormones having cortisone-like anti-inflammatory activity and more particularly to the 17α,21-oxido derivatives of cortisone and hydrocortisone.

The compounds of the present invention have the general formula

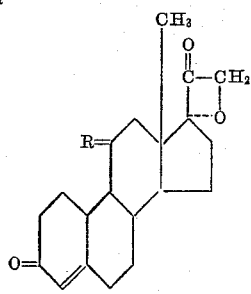

where R is selected from the group consisting of O= and

The compounds according to the present invention may be prepared from cortisone and hydrocortisone respectively.

The following equations represent the synthesis of 17α,21-oxido-4-pregnene-3,11,20-trione from cortisone.

This same series of steps may also be used to synthesize 17α,21-oxido-4-pregnene-11β-ol-3,20-dione from hydrocortisone.

Cortisone (I) or hydrocortisone is combined with methanesulfonyl chloride in the first step to produce cortisone methanesulfonate (II) or hydrocortisone methanesulfonate, respectively. This reaction is carried out at low temperature, for example, about 0° C. The methanesulfonate is combined with an alkali metal fluoride such as potassium fluoride at elevated temperature and preferably in an inert atmosphere. Surprisingly, the corresponding 21-fluoro compound (21-fluoro-4-pregnene-17α-ol-3,11,20-trione IV, or 21-fluoro-4-pregnene-11b,17α-diol-3,20-dione) is not the only or even the predominant steroid product of this reaction. Instead, a substantial quantity of II is converted to 17α,21-oxido-4-pregnene-3,11,20-trione (III). Similarly, hydrocortisone methanesulfonate is convertted in large part to 17α,21-oxido-4-pregnene-11β-ol-3,20-dione. Compounds III and IV (or the corresponding 17α,21-oxido and 21-fluoro derivatives of hydrocortisone) can be separated chromatographically. For example, III and IV can be extracted from the reaction product mixture with a suitable organic solvent such as methylene chloride, chloroform, ethyl acetate, or benzene, chromatographed, and the adsorbent developed with a suitable solvent combination. One such combination consists of ether and chloroform, from which the product (IV or hydrocortisone-17α,21-oxide) is recovered in the ether eluate.

The compounds of the present invention have cortisone-like anti-inflammatory activity. These compounds are also useful as intermediates for conversion to the 17a,21-oxido derivatives of prednisone and prednisolone, which possess greater anti-inflammatory activity. This conversion may be effected by a suitable dehydrogenating agent such as selenium dioxide or micro-organisms such as

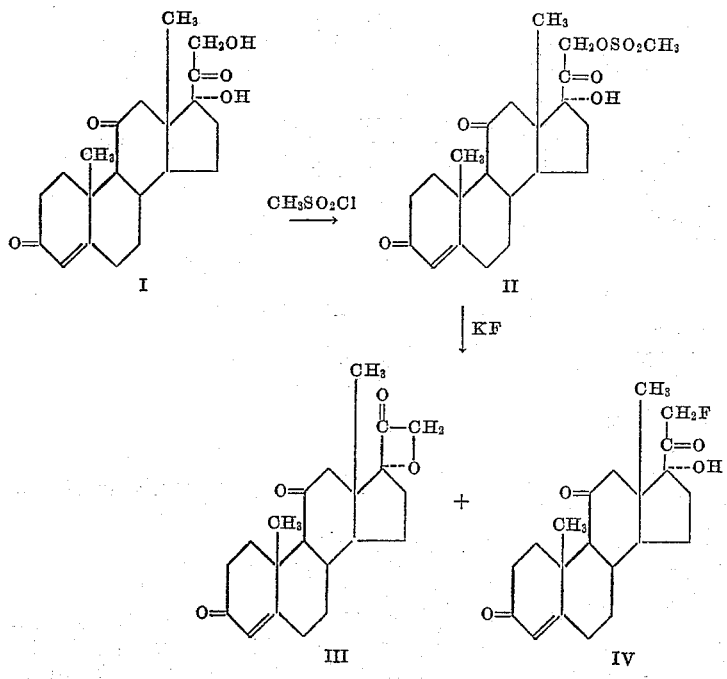

*Bacillus sphaericus.* The conversion of III to the 17α,21-oxido derivative of prednisone (V) may be represented by the following equation:

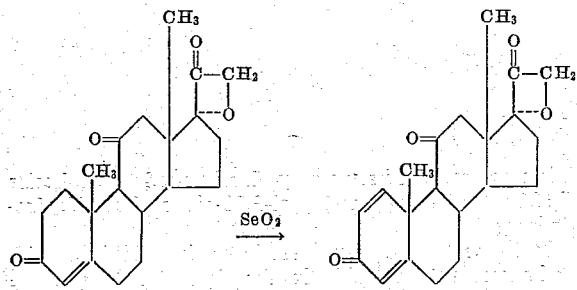

17α,21-oxido-4-pregnene-11β-ol-3,20-dione may be converted similarly to 17α,21-oxido-1,4-pregnadiene-11β-ol-3,20-dione.

This invention will now be described with reference to specific examples thereof.

EXAMPLE 1

*Preparation of 17α,21-oxide-4-pregnene-3,11,20-trione (III)*

Six grams of cortisone (I) were dissolved in 40 ml. of pyridine, cooled to 0° C. and treated with 1.6 ml. of methanesulfonyl chloride. After standing for one-half hour at 0° C., the reaction mixture was poured into 400 ml. of water and the aqueous suspension aged in an ice bath. The crystals were collected, washed with water and dried to give 6.6 g. of product. Recrystallization from methanol yielded substantially pure cortisone-21-methanesulfonate (II).

One gram of cortisone-21-methanesulfonate (II) and 1.75 g. of potassium fluoride were suspended in 35 ml. of ethylene glycol in a 100-ml. round-bottomed flask. The reaction mixture was heated in a nitrogen atmosphere for 4½ hours at 100° C. The mixture was then cooled in an ice bath, diluted with 100 ml. of water and extracted with two portions of 100 ml. each of methylene chloride. The extract was dried over anhydrous magnesium sulfate and the methylene chloride was then evaporated in vacuo. The residue which weighed 883 mg. was dissolved in 5 ml. of benzene and chromatographed on a column containing 25 g. of acid-washed, acetone-treated alumina. The column was eluted successively with 250 ml. of ether, 150 ml. of a 60:40 (by volume) chloroform-ether mixture, 200 ml. of a 80:20 chloroform-ether mixture and 250 ml. of chloroform. The product 17α,21-oxido-4-pregnene-3,11,20-trione (III) was recovered from the ether eluate. Yield 464 mg.; M. P. 208°–211° C. (215° C.); infrared spectrum, 5.56, 5.90, 6.02, 6.19; ultraviolet spectrum: λ max. 238, E% 475.

*Analysis.*—Calculated: C, 73.66%; H, 7.66%. Found: C, 73.38%; H, 7.52%.

An equivalent quantity of hydrocortisone may be converted to 17α,21 - oxido - 4 - pregnene - 11β - ol - 3,20-dione by the procedure of Example 1.

EXAMPLE 2

*Conversion of 17α,21 - oxido - 4 - pregnene - 3,11,20 - trione (III) to 17α,21 - oxido - 1,4 - pregnadiene - 3,11,20-trione (V)*

Three hundred mg. of 17α,21 - oxido - 4 - pregnane-3,11,20-trione were dissolved in 21 ml. of dry tert.-butanol, and 0.25 ml. of glacial acetic acid was added. To this mixture 100 mg. of selenium dioxide were added and the mixture refluxed under nitrogen for 24 hours. The supernatant liquid was decanted from the selenium and concentrated to dryness under vacuum. The residue was suspended in 10 ml. of water, extracted with 10 ml. of ethyl acetate, the extract separated, and the water layer extracted twice again with 10 ml. of ethyl acetate. The ethyl acetate extracts were combined, washed with dilute hydrochloric acid and aqueous sodium bicarbonate, and dried over magnesium sulfate. The ethyl acetate was distilled off. The residue was dissolved in 10 ml. of benzene, chromatographed on 10 g. of acetone- activated, acid-washed alumina, and eluted with mixtures of petroleum ether and ether, starting with a 1:1 mixture of petroleum ether and ether, gradually increasing the amount of ether and finally eluting with pure ether. The 17α,21-oxido - 1,4 - pregnadiene - 3,11,20 - trione product was recovered from the ether eluate and recrystallized from acetone-petroleum ether; M. P. 242° to 244° C.

The procedure of Example 2 can also be used to convert 17α,21 - oxidio - 4 - pregnene - 11β - ol - 3,20 - dione to 17α,21-oxido-1,4-pregnadiene-11β-ol-3,20-dione.

EXAMPLE 3

A nutrient medium having the following composition:

|  | Percent |
|---|---|
| Commercial lactalbumin digest ("Edamine") | 2 |
| Commercial dextrose | 3 |
| Corn steep liquor | 0.5 |
| KOH to adjust pH to 6.5. |  | was sterilized by autoclaving at 120° C. and introduced in 25-ml. portions into 125-ml. shake flasks. A culture of *Bacillus sphaericus* (MB–880) was grown on the above nutrient medium for 24 hours at 28° C. in the shake flasks, which were agitated on a rotary shaker at 220 R. P. M. Then 5 mg. of 17α,21-oxido-4-pregnene-11β-ol-3,20-dione in dimethylformamide solution, having a concentration of 100 mg./ml., was added to each flask, and incubation was continued for an additional 24 hours under the same conditions. The whole broth was then extracted with an equal volume of ethyl acetate in three equal portions, and the extracts were combined and concentrated to 3 ml. The concentrate was spotted on paper and developed in the system benzene-formamide according to the procedure of Zaffaroni et al., Science 111, 6 (1950). The running rate of the material was identical with that of an authentic sample of 17α,21-oxido-1,4-pregnadiene-11β-ol-3,20-dione. The mobility of the product was 0.7 times that of the substrate. The product was eluted from the paper strip with methanol, and showed an ultra-violet absorption maximum at 239 mμ. The methanol was evaporated, and the residue dissolved in 95% sulfuric acid. Analysis made at the end of two hours showed maxima at 235, 265, 287, and 383 mμ.

While this invention has been described with reference to specific embodiments thereof, it is understood that these embodiments are illustrative and that the scope of this invention is measured only by the scope of the appended claims.

What is claimed is:

1. A process for producing a compound of the group having the general formula

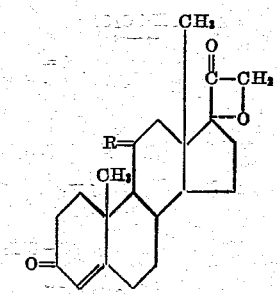

where R is selected from the group consisting of O= and

which comprises combining the corresponding 20-keto-17α,21-dihydroxy compound with methanesulfonyl chloride, thereby forming the corresponding 20-keto-17α- hydroxy-21-methanesulfonate, combining the 20-keto-17α-hydroxy-21-methanesulfonate at elevated temperature with an alkali metal fluoride, and separating the resulting 17α,21-oxido compound from the reaction mixture.

2. A process for producing a compound of the group having the general formula

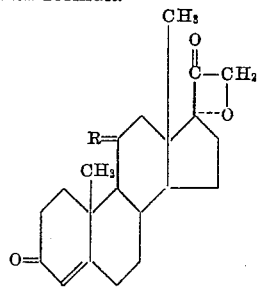

where R is selected from the group consisting of O= and

which comprises combining the corresponding 20-keto-17α,21-dihydroxy compound with methanesulfonyl chloride, thereby forming the corresponding 20-keto-17α-hydroxy - 21 - methanesulfonate, combining the 20-keto-17α-hydroxy-21-methanesulfonate at elevated temperature with an alkali metal fluoride, dissolving the steroids in the reaction mixture in an organic solvent, chromatographing the resulting solution, and recovering a fraction containing a major amount of 17α,21-oxido unsaturated pregnane compound.

3. A process for producing the compound having the formula

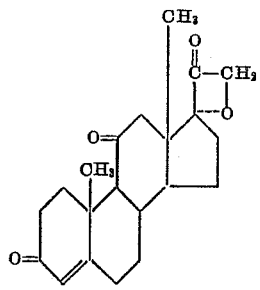

which comprises combining cortisone with methane-sulfonyl chloride, thereby forming Δ⁴-pregnene-17α-ol-3,11,20-trione-21-methanesulfonate, combining said compound at elevated temperature with an alkali metal fluoride, and separating the resulting 17α,21-oxido-Δ⁴-pregnene-3,11,20-trione.

4. A process for producing the compound having the formula

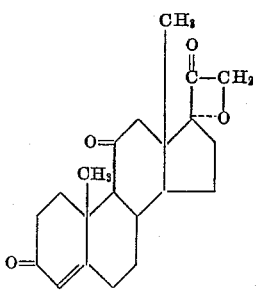

which comprises combining cortisone with methanesulfonyl chloride, thereby forming Δ⁴-pregnene-17α-ol-3,11,20-trione-21-methanesulfonate, combining said compound at elevated temperature with an alkali metal fluoride, dissolving the steroids in the reaction mixture in an organic solvent, chromatographing the resulting solution, and recovering a fraction containing a major amount of 17α,21-oxido-Δ⁴-pregnene-3,11,20-trione.

5. The compound having the formula

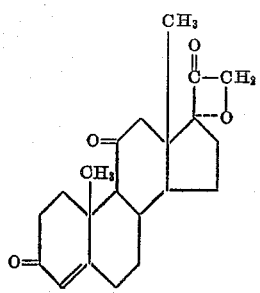

No references cited.